(12) United States Patent
Line et al.

(10) Patent No.: US 9,302,643 B2
(45) Date of Patent: Apr. 5, 2016

(54) VEHICLE SEATING ASSEMBLY WITH SIDE AIRBAG DEPLOYMENT

(71) Applicant: Ford Global Technologies, LLC, Dearborn, MI (US)

(72) Inventors: Johnathan Andrew Line, Northville, MI (US); Marcos Silva Kondrad, Macomb, MI (US); Nicholas Alphonse Billardello, Macomb, MI (US); Christian J. Hosbach, Allen Park, MI (US); David Frederick Lyons, Jr., New Haven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/243,060

(22) Filed: Apr. 2, 2014

(65) Prior Publication Data

US 2015/0283970 A1    Oct. 8, 2015

(51) Int. Cl.
*B60R 21/20* (2011.01)
*B60R 21/2165* (2011.01)
(Continued)

(52) U.S. Cl.
CPC .............. *B60R 21/2165* (2013.01); *B60N 2/58* (2013.01); *B60R 21/207* (2013.01); *B60N 2002/5808* (2013.01); *B60R 2021/21506* (2013.01)

(58) Field of Classification Search
CPC  B60R 21/207; B60R 21/215; B60R 21/2165; B60R 2021/21506; B60R 2002/5808; B60N 2/58
USPC ................... 280/728.2, 728.3, 730.2
See application file for complete search history.

(56) References Cited

U.S. PATENT DOCUMENTS 2,958,369 A    11/1960  Pitts et al.
3,403,938 A    10/1968  Cramer et al.
(Continued)

FOREIGN PATENT DOCUMENTS

EP    0754590    1/1997
EP    0926969    1/2002
(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.
(Continued)

*Primary Examiner* — Karen Beck
(74) *Attorney, Agent, or Firm* — Vichit Chea; Price Heneveld LLP

(57) ABSTRACT

A vehicle seating assembly having a first trim piece including a flange having a first side with intermittently-spaced elongate protrusions and a second side with intermittently-spaced attachment elements. A second trim piece including an inner wall having intermittently-spaced retention windows and an outer wall having an elongate channel disposed on an inner wall surface thereof, the inner and outer walls defining a cavity therebetween. The flange engages the cavity such that the intermittently-spaced elongate protrusions are removably engaged with the elongate channel and the intermittently-spaced attachment elements are removably engaged with the intermittently-spaced retention windows. An airbag deployment system is positioned proximate the first and second trim pieces and configured to deploy an airbag between the first and second trim pieces.

20 Claims, 10 Drawing Sheets

(51) Int. Cl.
*B60N 2/58* (2006.01)
*B60R 21/207* (2006.01)
*B60R 21/215* (2011.01)

(56) References Cited

U.S. PATENT DOCUMENTS

| | | | |
|---|---|---|---|
| 3,929,374 A | 12/1975 | Hogan et al. | |
| 4,324,431 A | 4/1982 | Murphy et al. | |
| 4,334,709 A | 6/1982 | Akiyama et al. | |
| 4,353,595 A | 10/1982 | Kaneko et al. | |
| 4,541,669 A | 9/1985 | Goldner | |
| 4,629,248 A | 12/1986 | Mawbey | |
| 4,720,141 A | 1/1988 | Sakamoto et al. | |
| 4,915,447 A | 4/1990 | Shovar | |
| 5,171,062 A | 12/1992 | Courtois | |
| 5,174,526 A | 12/1992 | Kanigowski | |
| 5,518,294 A | 5/1996 | Ligon, Sr. et al. | |
| 5,560,681 A | 10/1996 | Dixon et al. | |
| 5,647,635 A | 7/1997 | Aumond et al. | |
| 5,755,493 A | 5/1998 | Kodaverdian | |
| 5,769,489 A | 6/1998 | Dellanno | |
| 5,826,938 A | 10/1998 | Yanase et al. | |
| 5,836,648 A | 11/1998 | Karschin et al. | |
| 5,902,014 A | 5/1999 | Dinkel et al. | |
| 5,913,568 A | 6/1999 | Brightbill et al. | |
| 5,951,039 A * | 9/1999 | Severinski | B60R 21/207 280/728.2 |
| 6,024,406 A | 2/2000 | Charras et al. | |
| 6,062,642 A | 5/2000 | Sinnhuber et al. | |
| 6,145,925 A | 11/2000 | Eksin et al. | |
| 6,155,593 A | 12/2000 | Kimura et al. | |
| 6,179,379 B1 | 1/2001 | Andersson | |
| 6,189,966 B1 | 2/2001 | Faust et al. | |
| 6,196,627 B1 | 3/2001 | Faust et al. | |
| 6,206,466 B1 | 3/2001 | Komatsu | |
| 6,217,062 B1 | 4/2001 | Breyvogel et al. | |
| 6,220,661 B1 | 4/2001 | Peterson | |
| 6,224,150 B1 | 5/2001 | Eksin et al. | |
| 6,296,308 B1 | 10/2001 | Cosentino et al. | |
| 6,312,050 B1 | 11/2001 | Eklind | |
| 6,341,797 B1 | 1/2002 | Seo | |
| 6,364,414 B1 | 4/2002 | Specht | |
| 6,375,269 B1 | 4/2002 | Maeda et al. | |
| 6,394,546 B1 | 5/2002 | Knoblock et al. | |
| 6,454,353 B1 | 9/2002 | Knaus | |
| 6,523,892 B1 | 2/2003 | Kage et al. | |
| 6,550,856 B1 | 4/2003 | Ganser et al. | |
| 6,565,150 B2 | 5/2003 | Fischer et al. | |
| 6,619,605 B2 | 9/2003 | Lambert | |
| 6,682,140 B2 | 1/2004 | Minuth et al. | |
| 6,695,406 B2 | 2/2004 | Plant | |
| 6,698,832 B2 | 3/2004 | Boudinot | |
| 6,736,452 B2 | 5/2004 | Aoki et al. | |
| 6,758,522 B2 | 7/2004 | Ligon, Sr. et al. | |
| 6,808,230 B2 | 10/2004 | Buss et al. | |
| 6,824,212 B2 | 11/2004 | Malsch et al. | |
| 6,848,742 B1 | 2/2005 | Aoki et al. | |
| 6,860,559 B2 | 3/2005 | Schuster, Sr. et al. | |
| 6,860,564 B2 | 3/2005 | Reed et al. | |
| 6,866,339 B2 | 3/2005 | Itoh | |
| 6,869,140 B2 | 3/2005 | White et al. | |
| 6,890,029 B2 | 5/2005 | Svantesson | |
| 6,938,953 B2 | 9/2005 | Håland et al. | |
| 6,955,399 B2 | 10/2005 | Hong | |
| 6,962,392 B2 | 11/2005 | O'Connor | |
| 6,988,770 B2 | 1/2006 | Witchie | |
| 6,997,473 B2 | 2/2006 | Tanase et al. | |
| 7,040,699 B2 | 5/2006 | Curran et al. | |
| 7,100,992 B2 | 9/2006 | Bargheer et al. | |
| 7,131,694 B1 | 11/2006 | Buffa | |
| 7,159,934 B2 | 1/2007 | Farquhar et al. | |
| 7,185,950 B2 | 3/2007 | Pettersson et al. | |
| 7,213,876 B2 | 5/2007 | Stoewe | |
| 7,229,118 B2 | 6/2007 | Saberan et al. | |
| 7,261,371 B2 | 8/2007 | Thunissen et al. | |
| 7,267,363 B2 * | 9/2007 | Tredez | B60R 21/207 280/728.3 |
| 7,344,189 B2 | 3/2008 | Reed et al. | |
| 7,350,859 B2 | 4/2008 | Klukowski | |
| 7,393,005 B2 * | 7/2008 | Inazu et al. | 280/730.2 |
| 7,425,034 B2 | 9/2008 | Bajic et al. | |
| 7,441,838 B2 | 10/2008 | Patwardhan | |
| 7,467,823 B2 | 12/2008 | Hartwich | |
| 7,478,869 B2 | 1/2009 | Lazanja et al. | |
| 7,481,489 B2 | 1/2009 | Demick | |
| 7,506,924 B2 | 3/2009 | Bargheer et al. | |
| 7,506,938 B2 | 3/2009 | Brennan et al. | |
| 7,530,633 B2 | 5/2009 | Yokota et al. | |
| 7,543,888 B2 | 6/2009 | Kuno | |
| 7,578,552 B2 | 8/2009 | Bajic et al. | |
| 7,597,398 B2 | 10/2009 | Lindsay | |
| 7,614,693 B2 | 11/2009 | Ito | |
| 7,641,281 B2 | 1/2010 | Grimm | |
| 7,669,925 B2 | 3/2010 | Beck et al. | |
| 7,669,928 B2 | 3/2010 | Snyder | |
| 7,712,833 B2 | 5/2010 | Ueda | |
| 7,717,459 B2 | 5/2010 | Bostrom et al. | |
| 7,726,733 B2 | 6/2010 | Balser et al. | |
| 7,735,932 B2 | 6/2010 | Lazanja et al. | |
| 7,752,720 B2 | 7/2010 | Smith | |
| 7,753,451 B2 | 7/2010 | Maebert et al. | |
| 7,775,602 B2 | 8/2010 | Lazanja et al. | |
| 7,784,863 B2 | 8/2010 | Fallen | |
| 7,802,843 B2 | 9/2010 | Andersson et al. | |
| 7,819,470 B2 | 10/2010 | Humer et al. | |
| 7,819,480 B2 | 10/2010 | Asbury et al. | |
| 7,823,971 B2 | 11/2010 | Humer et al. | |
| 7,845,729 B2 | 12/2010 | Yamada et al. | |
| 7,857,381 B2 | 12/2010 | Humer et al. | |
| 7,871,126 B2 | 1/2011 | Becker et al. | |
| 7,891,701 B2 | 2/2011 | Tracht et al. | |
| 7,909,360 B2 | 3/2011 | Marriott et al. | |
| 7,931,294 B2 | 4/2011 | Okada et al. | |
| 7,931,330 B2 | 4/2011 | Itou et al. | |
| 7,946,649 B2 | 5/2011 | Galbreath et al. | |
| 7,963,553 B2 | 6/2011 | Huynh et al. | |
| 7,963,595 B2 | 6/2011 | Ito et al. | |
| 7,963,600 B2 | 6/2011 | Alexander et al. | |
| 7,971,931 B2 | 7/2011 | Lazanja et al. | |
| 7,971,937 B2 | 7/2011 | Ishii et al. | |
| 8,011,726 B2 | 9/2011 | Omori et al. | |
| 8,016,355 B2 | 9/2011 | Ito et al. | |
| 8,029,055 B2 | 10/2011 | Hartlaub | |
| 8,038,222 B2 | 10/2011 | Lein et al. | |
| 8,075,053 B2 | 12/2011 | Tracht et al. | |
| 8,109,569 B2 | 2/2012 | Mitchell | |
| 8,123,246 B2 | 2/2012 | Gilbert et al. | |
| 8,128,167 B2 | 3/2012 | Zhong et al. | |
| 8,162,391 B2 | 4/2012 | Lazanja et al. | |
| 8,162,397 B2 | 4/2012 | Booth et al. | |
| 8,167,370 B2 | 5/2012 | Arakawa et al. | |
| 8,210,568 B2 | 7/2012 | Ryden et al. | |
| 8,210,605 B2 | 7/2012 | Hough et al. | |
| 8,210,611 B2 | 7/2012 | Aldrich et al. | |
| 8,226,165 B2 | 7/2012 | Mizoi | |
| 8,342,607 B2 | 1/2013 | Hofmann et al. | |
| 8,511,748 B2 | 8/2013 | McLeod et al. | |
| 8,905,431 B1 * | 12/2014 | Line | B60R 21/215 280/728.2 |
| 2004/0195870 A1 | 10/2004 | Bohlender et al. | |
| 2005/0200166 A1 | 9/2005 | Noh | |
| 2006/0043279 A1 | 3/2006 | Friedman et al. | |
| 2006/0113751 A1 * | 6/2006 | Tracht | B60N 2/5825 280/728.2 |
| 2007/0120401 A1 | 5/2007 | Minuth et al. | |
| 2008/0174159 A1 | 7/2008 | Kojima et al. | |
| 2009/0066122 A1 | 3/2009 | Minuth et al. | |
| 2009/0165263 A1 | 7/2009 | Smith | |
| 2009/0322124 A1 | 12/2009 | Barkow et al. | |
| 2010/0038937 A1 | 2/2010 | Andersson et al. | |
| 2010/0140986 A1 | 6/2010 | Sawada | |
| 2010/0171346 A1 | 7/2010 | Laframboise et al. | |
| 2010/0187881 A1 | 7/2010 | Fujita et al. | |
| 2010/0201167 A1 | 8/2010 | Wieclawski | |

(56) References Cited

U.S. PATENT DOCUMENTS

| | | |
|---|---|---|
| 2010/0231013 A1 | 9/2010 | Schlenker |
| 2010/0270840 A1 | 10/2010 | Tanaka et al. |
| 2010/0301650 A1 | 12/2010 | Hong |
| 2010/0320816 A1 | 12/2010 | Michalak |
| 2011/0018498 A1 | 1/2011 | Soar |
| 2011/0074185 A1 | 3/2011 | Nakaya et al. |
| 2011/0095513 A1* | 4/2011 | Tracht ............... B60N 2/5816 280/730.2 |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Brncick et al. |
| 2011/0133525 A1 | 6/2011 | Oota |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0254335 A1 | 10/2011 | Pradier et al. |
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0032486 A1 | 2/2012 | Baker et al. |
| 2012/0037754 A1 | 2/2012 | Kladde |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1* | 5/2012 | Kitaguchi ............... B60K 1/04 454/120 |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |
| 2012/0299342 A1* | 11/2012 | Mizobata ............... 297/216.1 |
| 2013/0015643 A1* | 1/2013 | Gorman ............... B60R 21/207 280/730.2 |
| 2013/0076092 A1 | 3/2013 | Kulkarni et al. |
| 2015/0283970 A1* | 10/2015 | Line ............... B60N 2/58 280/728.3 |

FOREIGN PATENT DOCUMENTS

| | | |
|---|---|---|
| EP | 1325838 A1 | 7/2003 |
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| JP | 201178557 A | 4/2011 |
| WO | WO9511818 | 5/1995 |
| WO | WO9958022 | 11/1999 |
| WO | WO2006131189 | 12/2006 |
| WO | WO2007028015 | 8/2007 |
| WO | 2008019981 A1 | 2/2008 |
| WO | WO2008073285 | 6/2008 |
| WO | WO2011021952 | 2/2011 |
| WO | WO2012008904 | 1/2012 |

OTHER PUBLICATIONS

"Thigh Support For Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

ecoustics.com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

* cited by examiner

VEHICLE SEATING ASSEMBLY WITH SIDE AIRBAG DEPLOYMENT

FIELD

The present disclosure generally relates to an airbag deployment system, and more particularly relates to a side airbag deployment system that is attached to and deploys from a vehicle seat.

BACKGROUND

It is becoming increasingly more common for vehicles to include airbag assemblies in locations that allow the contained airbag to deploy to desired areas of protection quickly and with a high degree of precision. It is generally understood that one location airbag assemblies are more frequently incorporated is within a seatback for deploying between a passenger and an adjacent vehicle door. Typically, these side airbags are encased within the fabric upholstery material of the seatback, such that upon deployment of the airbag the upholstery material is torn. This form of deployment may result in inconsistent airbag deployment and substantial damage to the seatback. As vehicle seats are equipped with airbag assemblies, it is also becoming desirable to decrease the overall volume of vehicle seats for reducing weight and providing adequate space for the passengers within the vehicle.

SUMMARY

According to one embodiment, a vehicle seating assembly includes a first trim piece including a flange having a first side with intermittently-spaced elongate protrusions and a second side with intermittently-spaced attachment elements. The vehicle seating assembly also has a second trim piece including an inner wall having intermittently-spaced retention windows and an outer wall having an elongate channel disposed on an inner wall surface thereof, the inner and outer walls defining a cavity therebetween. The flange engages the cavity such that the intermittently-spaced elongate protrusions are removably engaged with the elongate channel and the intermittently-spaced attachment elements are removably engaged with the intermittently-spaced retention windows. The assembly also includes an airbag deployment system positioned proximate the first and second trim pieces and configured to deploy an airbag between the first and second trim pieces.

In another embodiment, a seating assembly includes a first trim piece having a flange including a first side with an elongate protrusion and a second side with an attachment element. The assembly also has a second trim piece including an inner wall having a window and an outer wall having an elongate channel. The inner and outer walls define a cavity along an edge of the second trim piece. The elongate protrusion engages the elongate channel and the attachment element engages the window. The assembly also includes an airbag deployment system which is configured to deploy an airbag between the first and second trim pieces.

In yet another embodiment, a vehicle seating assembly includes an airbag deployment system. The assembly also has a front trim piece including a flange having intermittently-spaced attachment elements and a rear trim piece including inner and outer walls defining a cavity. The inner wall has a plurality of windows disposed thereon. The attachment elements snap-fit into the windows such that the flange engages the cavity to define a breakaway seam upon airbag deployment.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
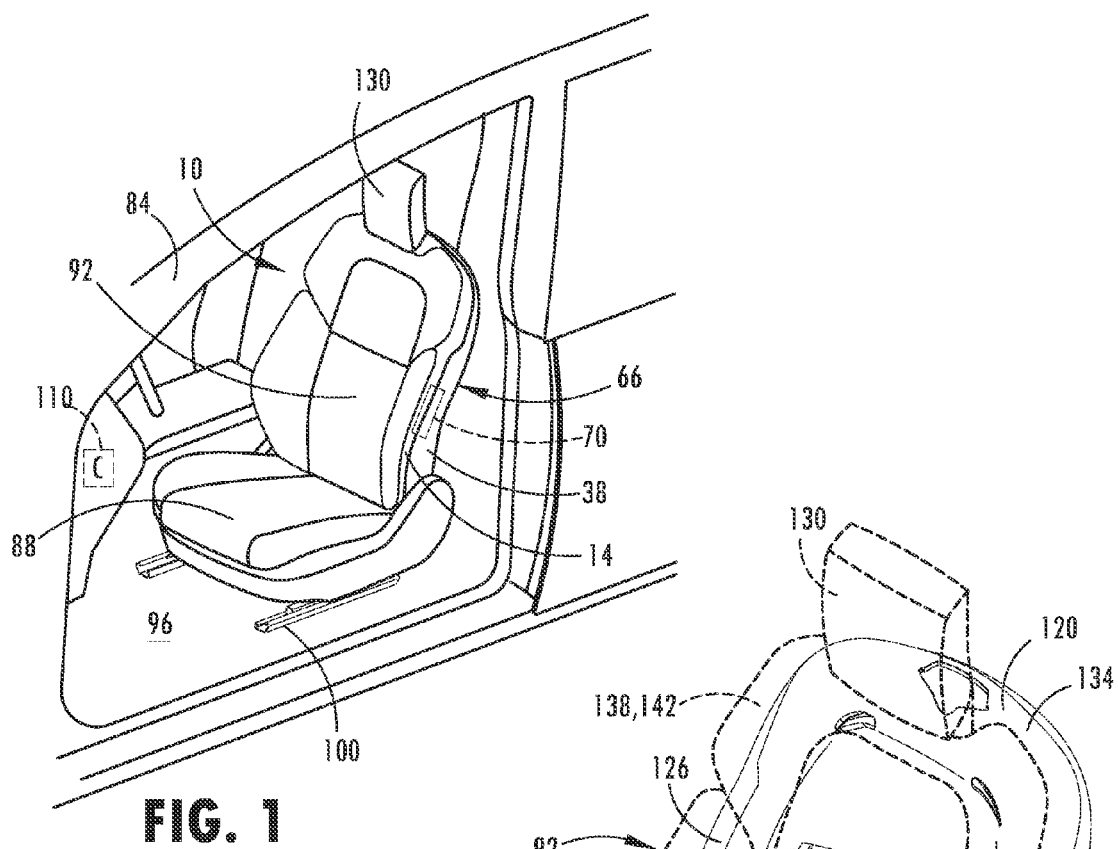
FIG. 1 is a top perspective view of one embodiment of a seating assembly within a vehicle.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-13A, reference numeral 10 generally designates a vehicle seating assembly that includes a first trim piece 14 including a flange 18 having a first side 22 with intermittently-spaced elongate protrusions 26 and a second side 30 with intermittently-spaced attachment elements 34. A second trim piece 38 includes an inner wall 42 having intermittently-spaced retention windows 46 and an outer wall 50 having an elongate channel 54 disposed on an inner wall surface 58 thereof. The inner and outer walls 42, 50 define a cavity 62 therebetween. The flange 18 engages the cavity 62 such that the intermittently-spaced elongate protrusions 26 are removably engaged with the elongate channel 54 and the intermittently-spaced attachment elements 34 are removably engaged with the intermittently-spaced retention windows 46. An airbag deployment system 66 is positioned proximate the first and second trim pieces 14, 38 and configured to deploy an airbag 70 between the first and second trim pieces 14, 38. The intermittently-spaced retention windows 46 and intermittently-spaced elongate protrusions 26 are configurable to provide a predetermined resistance to deployment of the airbag between the first and second trim pieces.

Referring now to FIG. 1, the vehicle seating assembly 10 is positioned in a driver side location of a vehicle 84. The vehicle seating assembly 10 includes a seat bottom 88 that is pivotally coupled with a seatback 92 for pivotally adjusting the seatback 92 between upright and reclined positions relative to the seat bottom 88. The seat bottom 88 is slidably coupled with a floor 96 of the vehicle 84 upon a track assembly 100. The track assembly 100 is configured to allow the vehicle seating assembly 10 to adjust in a forward and rearward direction relative to the floor 96 of the vehicle 84. It is understood that the vehicle seating assembly 10 may be positioned in various positions throughout the vehicle 84 other than the illustrated location, such as a passenger side location, a mid-row location, and a rear seat location. It is also conceivable that the vehicle seating assembly 10 may not include the reclining feature and may not include the track assembly 100, such that the vehicle seating assembly 10 may be fixedly or alternatively coupled with the floor 96 of the vehicle 84.

As also shown in FIG. 1, a controller 110 on the vehicle 84 is electrically coupled with the airbag deployment system 66. The controller 110 operates to actuate the airbag 70 within the airbag deployment system 66, causing the airbag 70 to inflate to a deployed position 118 (FIG. 3) when the controller 110 senses a collision event of the vehicle 84, as generally understood in the art. The airbag deployment system 66 is included on and deploys from the outboard side of a support structure 120 of the seatback 92. The outboard connotation, for purposes of this disclosure, refers to a lateral side most proximate a side door or a side interior region of the vehicle 84. In turn, the inboard connotation for purposes of this disclosure refers to an area most proximate in a central interior region of the vehicle 84 between the laterally opposing outboard sides.

Figure 2:
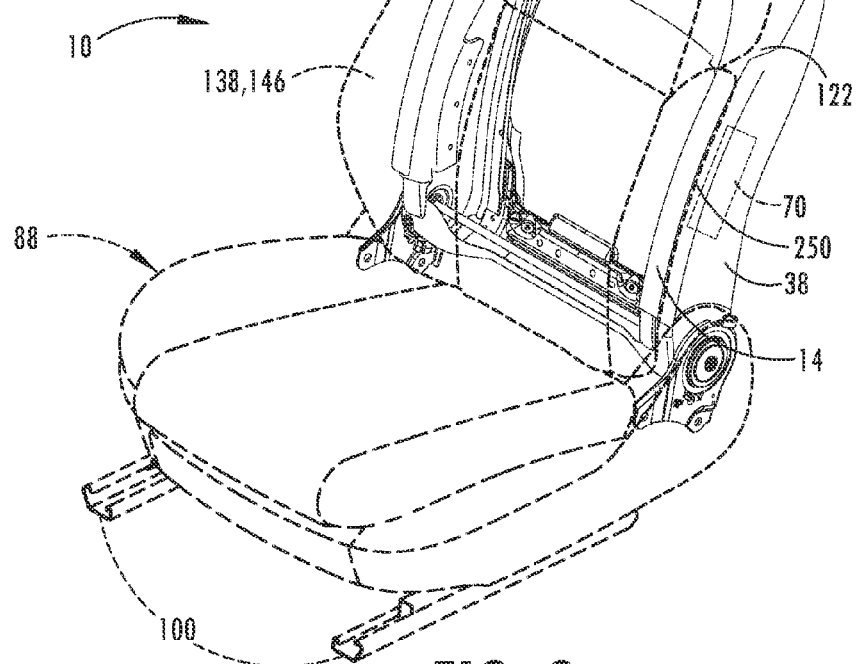
FIG. 2 is a top perspective view of the seating assembly showing a support structure with a seatback, passenger support, track assembly, and head restraint shown in dashed lines.

With reference to FIG. 2, the seatback 92 includes the support structure 120, which has a first side member 122 and a second side member 126, each pivotally coupled with a rear portion of the seat bottom 88. A head restraint 130 is coupled with and supported by a top member 134 of the support structure 120 and is positioned centrally between the first and second side members 122, 126. A passenger support 138 extends forward from the support structure 120 and includes an upper support component 142 and a lower support component 146 for supporting an occupant's upper and lower back, respectively. The upper support component 142 is configured to pivot forward relative to the support structure 120 and the lower support component 146 statically couples with the support structure 120. Although, it is conceivable that the upper support component 142 may also be static relative to the support structure 120. It is also contemplated that the upper and lower support components 142, 146 of the passenger support 138 may be a single integral component that extends forward from the support structure 120. Further, it is conceivable that the head restraint 130 may be integrated with the upper support component 142 or that the head restraint 130 may otherwise not be included on the vehicle seating assembly 10.

Figure 3:
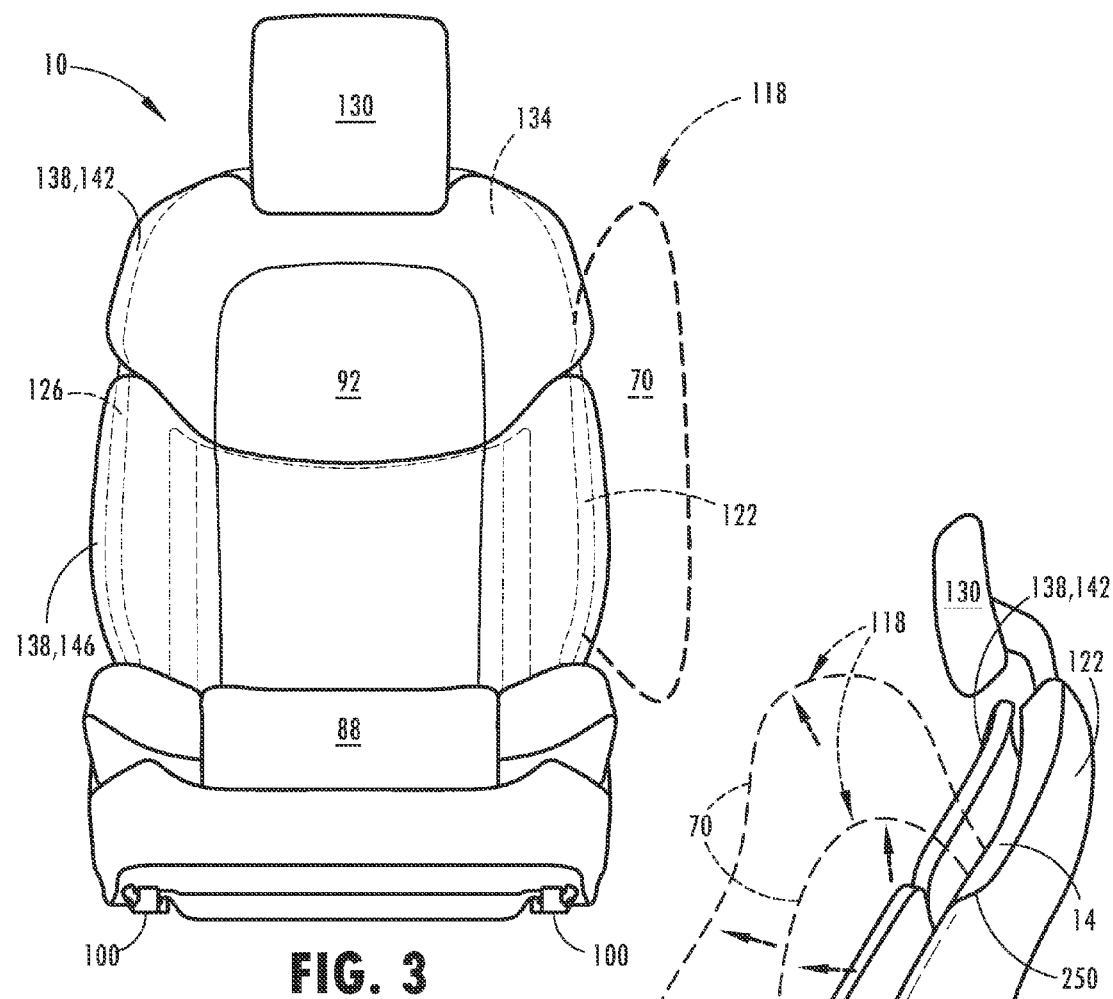
FIG. 3 is a front elevational view of one embodiment of a seating assembly, showing an airbag deployed in dashed lines.
Figure 4:
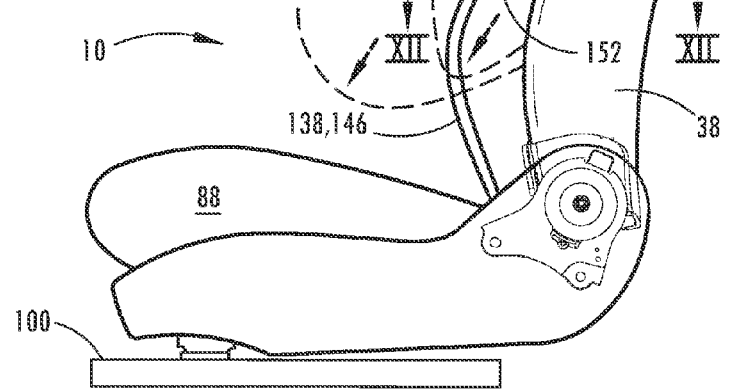
FIG. 4 is a side elevational view of one embodiment of a seating assembly, showing an airbag deployed in dashed lines.

The passenger support 138, as shown in the embodiment illustrated in FIGS. 3-4, extends forward and is suspended away from the support structure 120 to define an external peripheral gap 152 spanning along the first and second side members 122, 126 and the top member 134. The external peripheral gap 152 may expand upon forward pivoting of the upper support component 142 and may be compressed proximate an application of rearward force to the passenger support 138. However, the external peripheral gap 152 is configured to remain large enough for the airbag 70 of the airbag deployment system 66 to deploy forward from the first side member 122, through the external peripheral gap 152, and position the airbag 70 in a deployed position 118, as shown in dashed lines. The deployed position 118 of the airbag 70 in the illustrated embodiment aligns the airbag 70 accurately between an occupant seated in the seating assembly 10 and an adjacent door of the vehicle 84 (FIG. 1), as described in more detail below.

Figure 5:
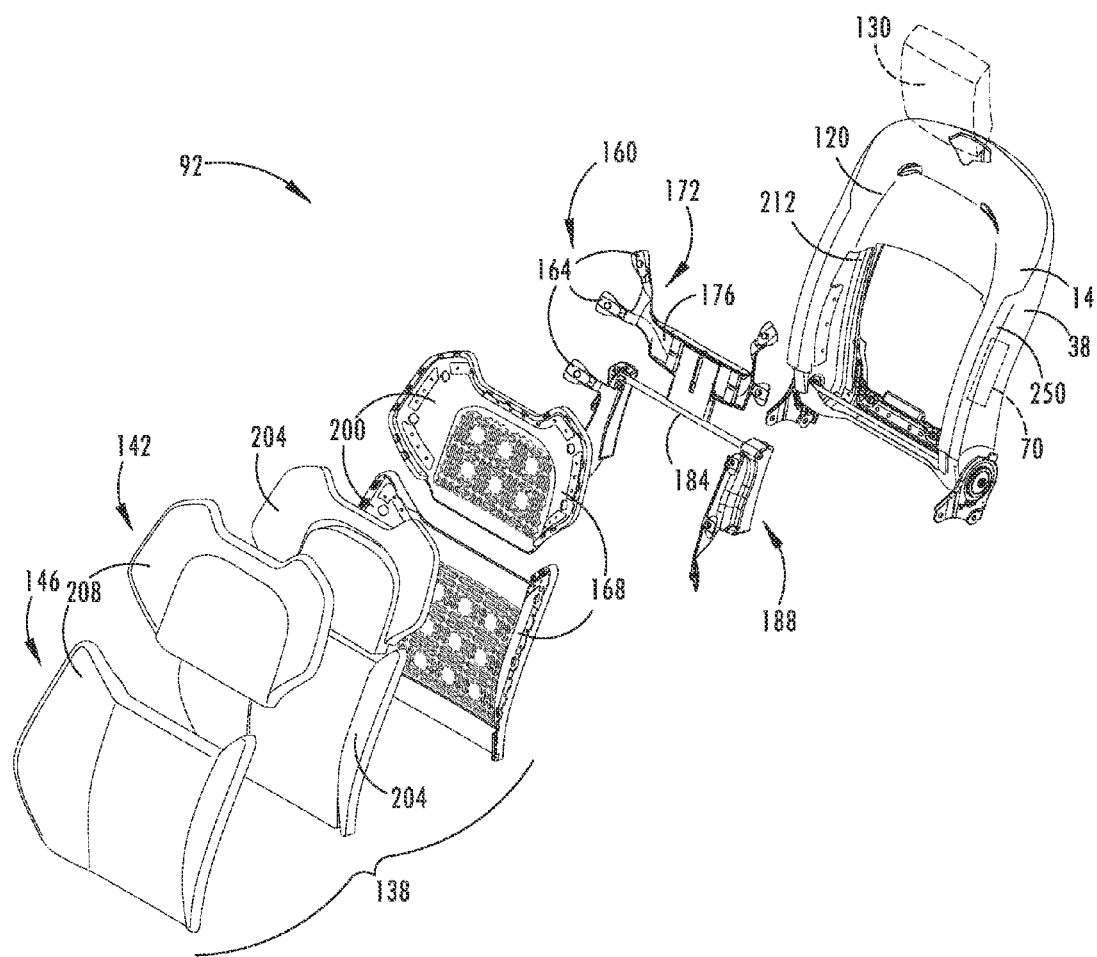
FIG. 5 is an exploded top perspective view of one embodiment of a seatback.

As illustrated in FIG. 5, the upper and lower support components 142, 146 of the passenger support 138 are attached to the support structure 120 with a suspension assembly 160. In the illustrated embodiment, the suspension assembly 160 includes flexible members 164 extending forward and laterally outward from the seatback support structure 120 to operably couple with angled side bolsters 168 of the passenger support 138. The angled side bolsters 168 are located on the lateral sides of the upper and lower support components 142, 146 and are integrated with the shape of the upper and lower support components 142, 146 to prevent lateral movement of an occupant's back relative to the support structure 120. An upper section 172 of the suspension assembly 160 has a central body 176 and two outwardly extending flexible members 164 on opposing sides of the central body 176. The central body 176 of the upper section 172 operably couples with a pivot bar 184 that laterally extends between the opposing side portions of a lower section 188 of the suspension assembly 160. The opposing side portions of the lower section 188 similarly include outwardly extending flexible members 164 that couple with the lower support component 146 of the passenger support 138. Accordingly, in the illustrated embodiment, the lower section 188 is static and the upper section 172 is configured to pivot forward about the pivot bar 184 to pivotally adjust the upper support component 142 relative to the lower support component 146. It is contemplated that the pivot bar 184 may be operably controlled with a motorized actuation assembly or a manually adjustable actuation mechanism, and also conceivable that the upper support component 142 may be statically coupled with the support structure 120 of the seatback 92. It is also conceivable that more or fewer flexible members 164 may be included on the upper and/or lower sections 172, 188, such as a single fin-shaped flexible member 164 on either side of the upper or lower sections 172, 188.

As also shown in FIG. 5, the passenger support 138 in the illustrated embodiment includes a trim carrier 200 having an open matrix that defines a pattern of resilient elements that are configured to support the weight of an occupant. The trim carrier 200 has an upper panel and a lower panel that detachably couple with the respective upper section 172 and the lower section 188 of the suspension assembly 160. The passenger support 138 also includes a cushion 204 that is disposed over a forward facing surface of the trim carrier 200. The cushion 204 includes a resilient structure of woven fibers that has open areas for ventilation; however, the cushion 204 may also include open cell foam, closed cell foam, or other conceivable flexible and breathable materials. Further, the passenger support 138 includes a cover stock 208 to define the back support surface of the passenger support 138 and to assist in retaining the cushion 204 against the trim carrier 200. The cover stock 208 may conceivably include a fabric material, a leather material, a vinyl material, or other upholstery materials generally known in the art.

Figure 6:
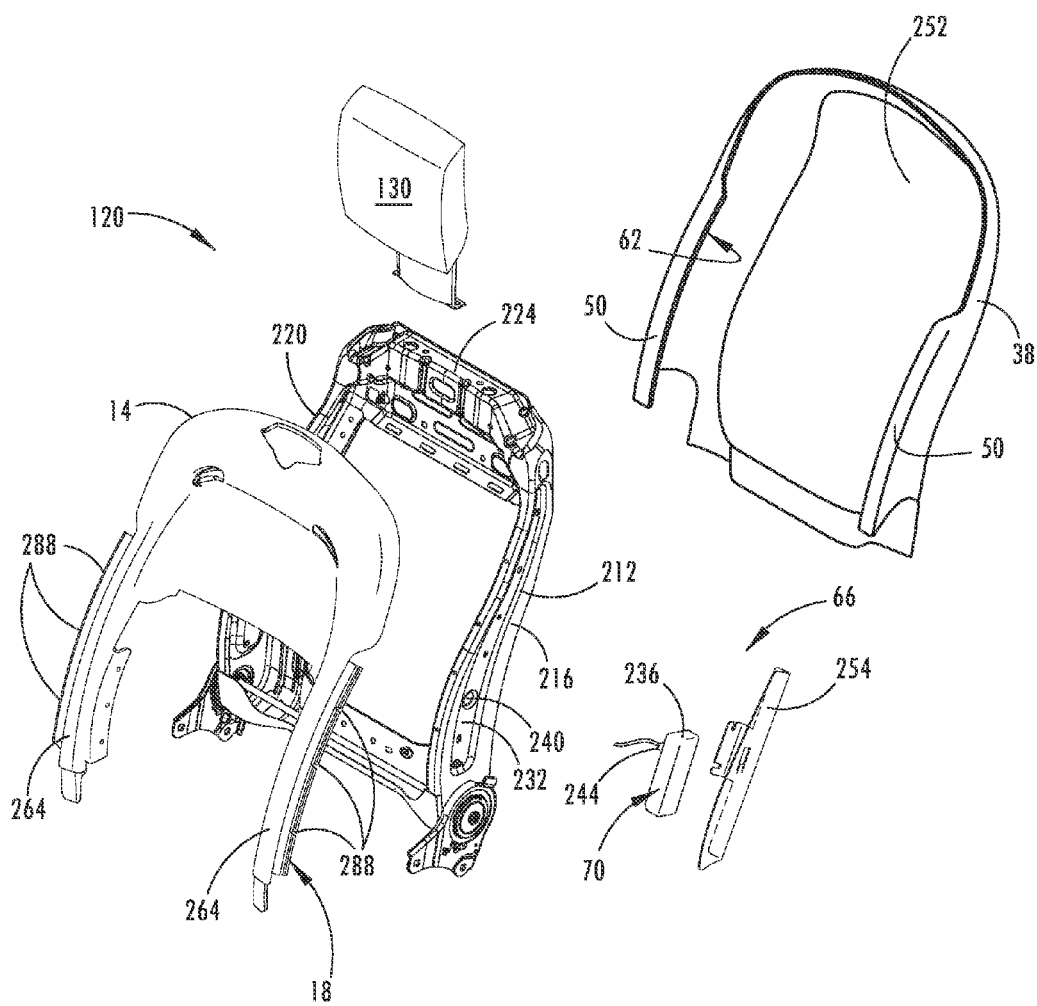
FIG. 6 is an exploded top perspective view of one embodiment of a support structure of a seatback.
Figure 13:
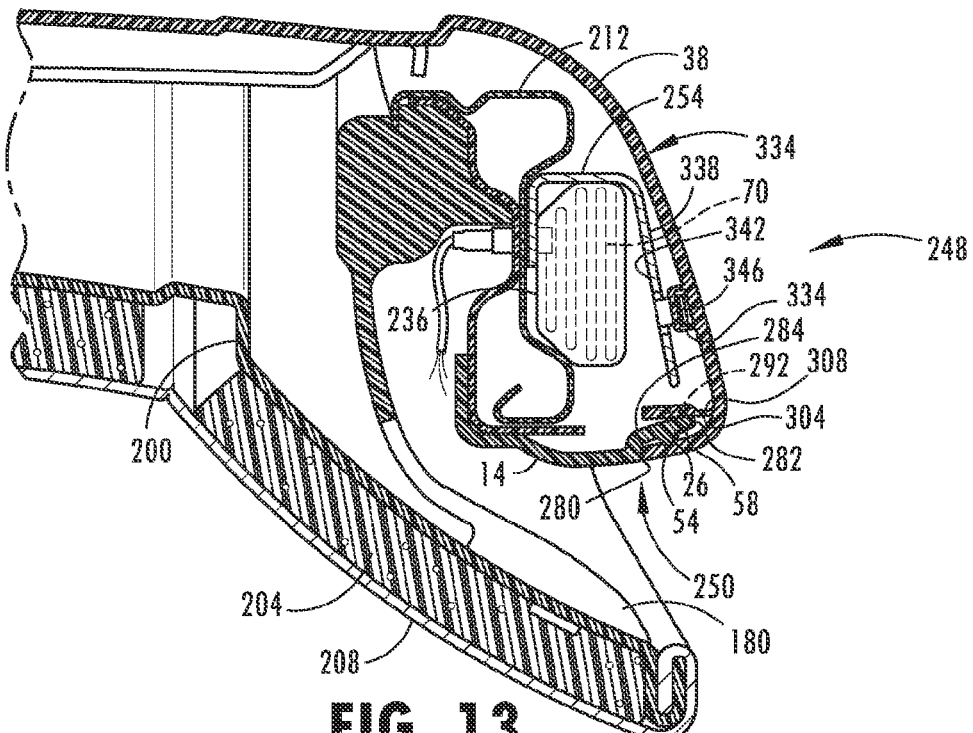
FIG. 13 is a cross-sectional view of the seatback having the airbag in a contained position, taken at line XII-XII of FIG. 4.

Referring now to FIG. 6, an internal seat frame 212 of the support structure 120 in the illustrated embodiment includes a first frame member 216 and a second frame member 220 extending upward from the pivotal connection with the recliner brackets that attach to the seat bottom 88 (FIG. 2). The first and second frame members 216, 220 are substantially parallel with each other and curve upward and rearward from the recliner brackets to provide a curved shape that is substantially similar to an occupant's spinal column. Further, the first and second frame members 216, 220 are more robust proximate the recliner brackets and taper as they extend upward to couple with a top frame member 224 that extends orthogonally between the first and second frame members 216, 220 to support the head restraint 130. Accordingly, the first and second side members 122, 126 of the overall support structure 120 include the first and second frame members 216, 220, respectively, and the top member 134 includes the top frame member 224. The first frame member 216 includes an elongate cavity 232 on an exterior side of the first frame member 216, such that the first frame member 216 corresponds with the outboard side of the vehicle seating assembly 10 in the driver's side location of the illustrated embodiment. The elongate cavity 232 is shaped to receive a base portion 236 of the airbag deployment system 66. A retention aperture 240 is formed in the elongate cavity 232 for receiving a lateral protrusion 244 on the base portion 236 that houses an electrical wire that extends from the airbag deployment system 66 to electrically couple with the vehicle controller 110. More specifically, an intermediate region of the longitudinal extent of the first frame member 216 includes a portion of the elongate cavity 232 that is shaped to retain the airbag 70 in a contained position 248 (FIG. 13).

As also illustrated in FIG. 6, the first and second trim pieces 14, 38 that engage to substantially enclose the internal seat frame 212 are shown exploded away from the internal seat frame 212. The first trim piece 14 is a front, or vehicle forward, piece and the second trim piece 38 is a rear trim piece. The first and second trim pieces 14, 38 removably engage along a seam 250 (FIG. 13) to conceal the airbag 70 and to define an exterior surface of the support structure 120. The first trim piece 14 includes a U-shape and substantially encloses a front portion of the internal seat frame 212 and it is contemplated that the first trim piece 14 may extend laterally inward to couple with the suspension assembly 160. The second trim piece 38 wraps over the exterior sides of the first and second frame members 216, 220 to partially conceal the elongate cavity 232 and includes a rear panel portion 252 that spans between the first and second frame members 216, 220 and to substantially enclose a rear portion of the seat frame 212. As also shown, an interior surface of the second trim piece 38 couples with a sleeve member 254 of the airbag deployment system 66, as described in more detail below. It is contemplated that the internal seat frame 212 is constructed of a metal material and that the first and second trim pieces 14, 38 are molded of a polymer material. However, it is also conceivable that the frame 212 may be constructed of other similar substantially rigid materials and the first and second trim pieces 14, 38 may be made of other flexible materials relative to the internal frame 212.

Figure 7:
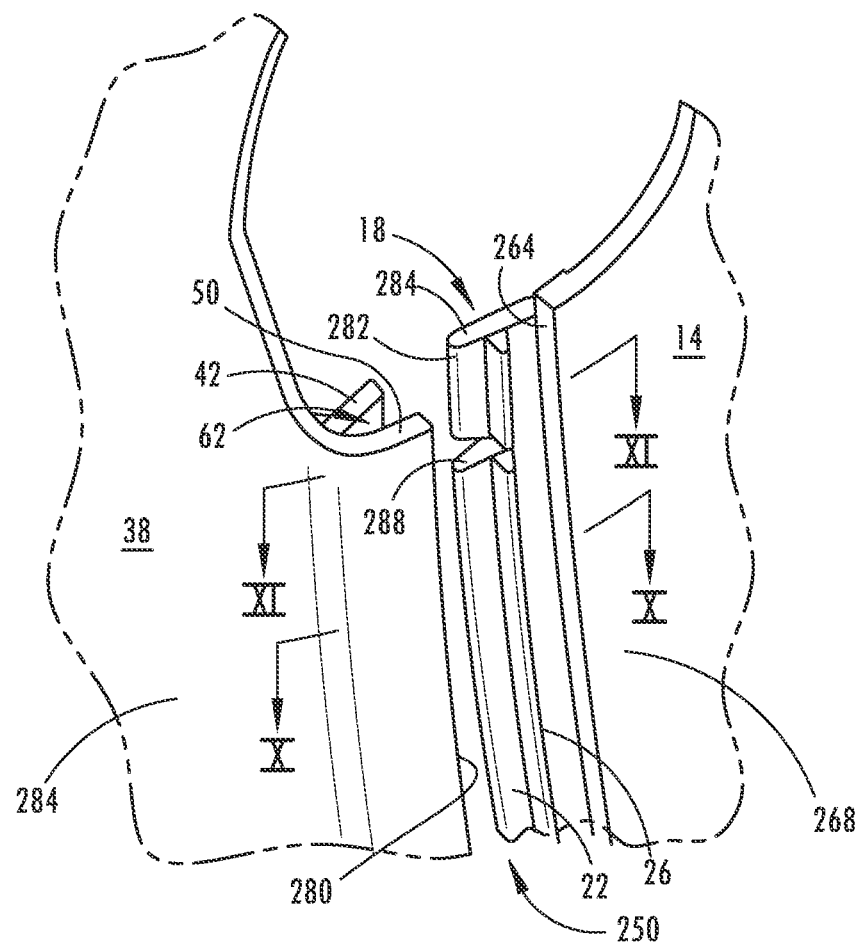
FIG. 7 is a top perspective view of one embodiment of a section of a first trim piece exploded from a section of a second trim piece.
Figure 8:
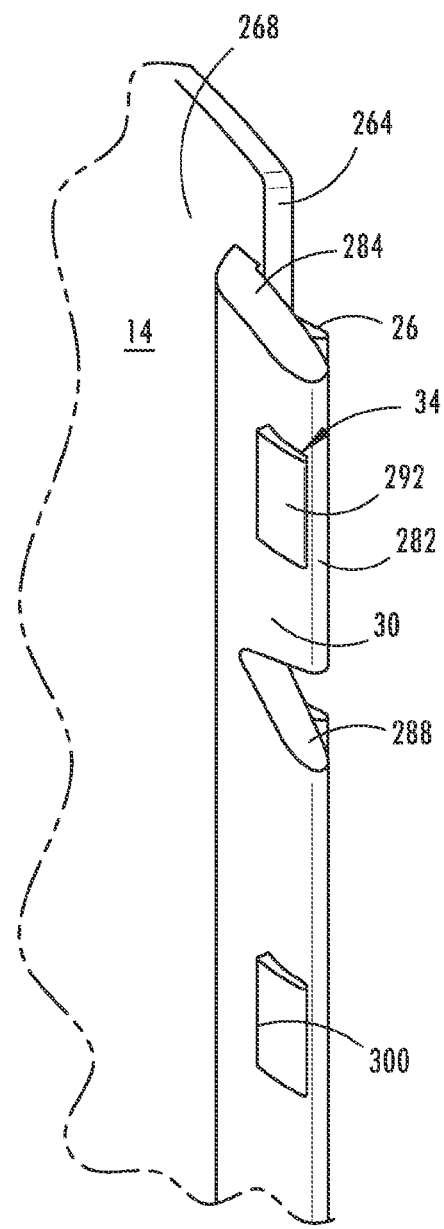
FIG. 8 is a top perspective view of one embodiment of a section of a first trim piece.

As illustrated in FIG. 7, portions of the first and second trim pieces 14, 38 are aligned to engage along the seam 250 over the exterior side member of the seat frame 212 (FIG. 6). More specifically, the first trim piece 14 includes the flange 18 which protrudes from an edge 264 of a body portion 268 of the first trim piece 14. The second trim piece 38 has both the inner and outer walls 42, 50 extending along a portion of an edge 280 of a body portion 284 of the second trim piece 38. The flange 18 is configured to align with the cavity 62 defined by the inner and outer walls 42, 50 such that the flange 18 can be inserted into the cavity 62. In other words, the connection between the trim pieces 14, 38 is of a tongue and groove variety wherein the flange 18 is the tongue and the cavity 62 is the groove.

As shown in the embodiments depicted in FIGS. 7-11B, the flange 18 extends laterally from the body portion 268 of the first trim piece 14 along a majority of the edge 264. The flange 18 integrally protrudes in planar alignment with the body portion 268 to a flange tip 282 and is inset inwards from an interior surface of the first trim piece 14. It is also considered that the flange 18 may extend at an inward angle from the first trim piece 14. The flange 18 includes the body portion 284, the plurality of intermittently-spaced elongate protrusions 26, and the plurality of intermittently-spaced attachment elements 34. The thickness of the body portion 284 is thinner than the width of the cavity 62 defined by the inner and outer walls 42, 50, such that the flange 18 can removably engage with the cavity 62. The plurality of elongate protrusions 26 integrally project from the first side 22 of the body portion 284 and extend the length of the flange 18. The elongate protrusions 26 are generally triangular in cross-section with a blunted tip and are intermittently-spaced apart on the flange 18 in a substantially straight line. It is contemplated that the body portion 284 may have a single elongate protrusion 26 projecting therefrom. The intermittent-spacing of the elongate protrusions 26 is due to a plurality of notches 288, defined by the body portion 284, which separate the elongate protrusions 26. Each notch 288 is an opening that extends between the flange first side 22 and the flange second side 30 through the body portion 284. The notches 288 are generally triangular in shape with a wide opening at the flange tip 282. The notches 288 extend inward, on the same plane as the flange 18, and terminate at rounded tips which generally separate the elongate protrusions 26. The plurality of notches 288 are intermittently-spaced along the length of the flange 18. It is also conceivable that the flange 18 may have a single notch 288. It is also contemplated that the notches 288 can be of different shapes or configurations including, but not limited to, squares, rectangles, or arcs of circles.

Figure 9:
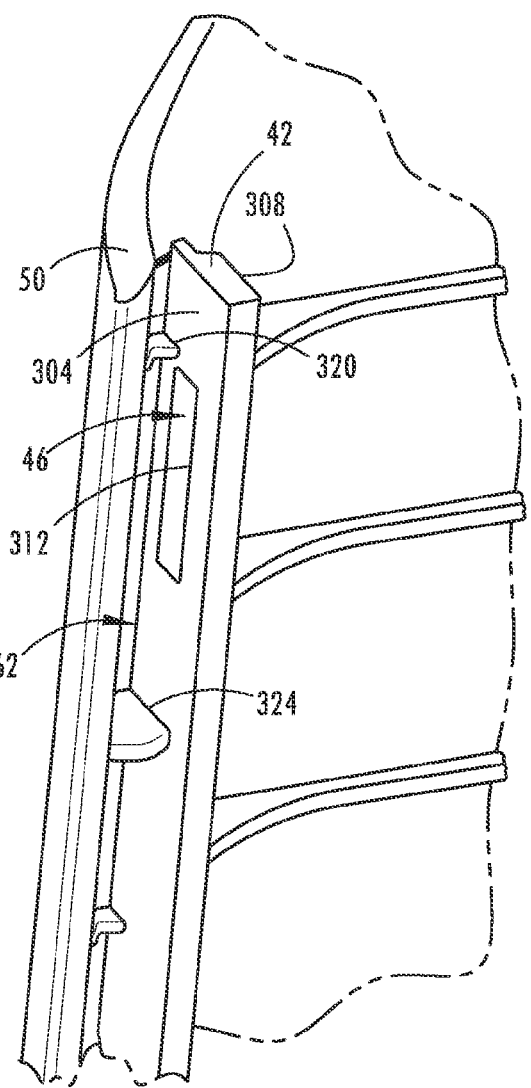
FIG. 9 is a top perspective view of one embodiment of a section of a second trim piece.
Figure 10:
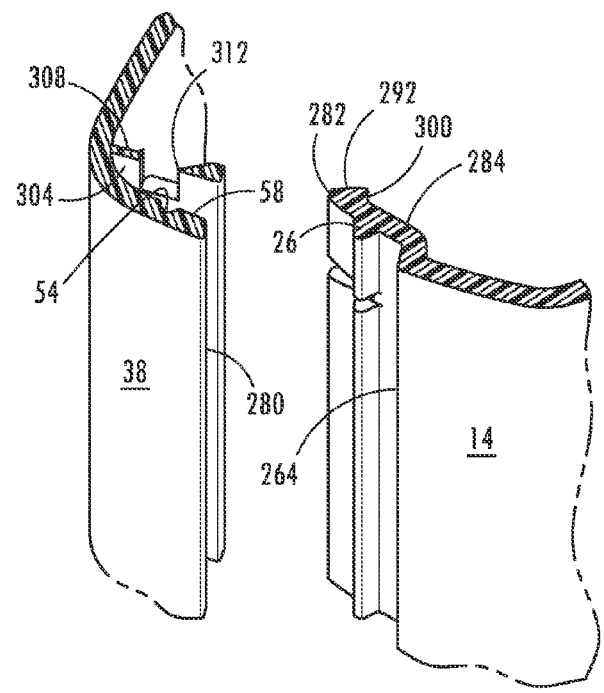
FIG. 10 is a top perspective cross-sectional view of the first trim piece separated from the second trim piece, taken at line X-X of FIG. 7.
Figure 10A:
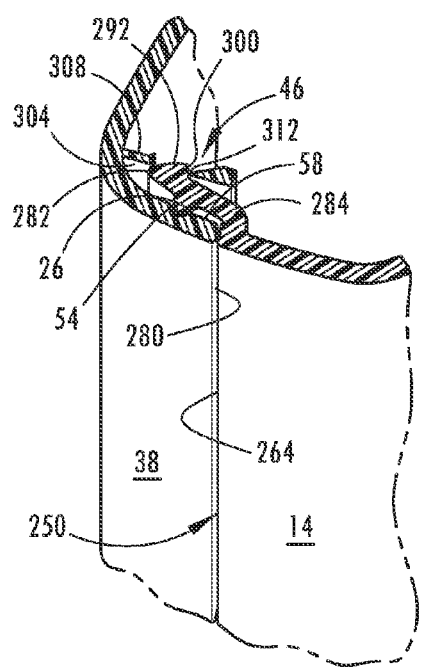
FIG. 10A is a top perspective cross-sectional view of the first trim piece engaged with the second trim piece, taken at line X-X of FIG. 7.
Figure 10B:
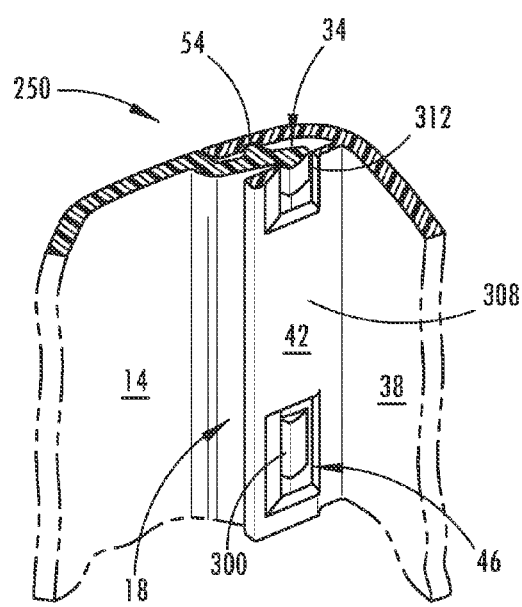
FIG. 10B is a top perspective cross-sectional view of the first trim piece engaged with the second trim piece, taken at line X-X of FIG. 7 and rotated relative to FIG. 10A.

Referring to FIGS. 8-11B, the flange 18 further includes a plurality of intermittently-spaced attachment elements 34 integrally protruding from the flange second side 30. Each attachment element 34 has a largely triangular cross-section including a sloped surface 292 beginning generally at the flange tip 282 and ending at a retention surface 300 (FIGS. 10 and 10A). Each retention surface 300 is a flat surface extending across the attachment element 34 and is generally perpendicular to the flange second side 30. It is conceivable that the retention surfaces 300 of the attachment elements 34 can be at a variety of orientations with respect to the flange second side 30. It is also considered that the attachment elements 34 may have a variety of other configurations or that the flange 18 may have a single attachment element 34 protruding from the body portion 284.

Now referring to FIGS. 9-11B, the inner wall 42 and the outer wall 50 of the second trim piece 38 are spaced apart such that the cavity 62 is defined therebetween. The outer wall 50 is a portion of the second trim piece 38 extending between the body portion 284 and the edge 280 of the second trim piece 38. The inner wall 42 integrally extends from the second trim piece 38 substantially parallel to the outer wall 50. The inner wall 42 defines the plurality of retention windows 46 which pass between an inner surface 304 and an outer surface 308 of the inner wall 42. FIG. 9 depicts a single retention window 46 of the plurality of retention windows 46 as generally rectangular and stretching along the length of the inner wall 42, but it is contemplated that the plurality of retention windows 46 may take a variety of configurations. The inner wall 42 defines the plurality of retention windows 46 in an intermittently-spaced pattern; however, it is contemplated that the retention windows 46 may take a variety of other spacings. The retention windows 46 include a retention edge 312 located along a distal portion of the inner wall 42. The retention edges 312 are configured to removably engage with the retention surfaces 300 of the attachment elements 34 upon the insertion of the flange 18 into the cavity 62. The outer wall 50 defines the elongate channel 54 (FIGS. 10-11B) on the inner wall surface 58 thereof. The elongate channel 54 extends a majority of the length of the cavity 62 and is configured to removably engage with the elongate protrusions 26. It is contemplated that the elongate channel 54 may be intermittently-spaced to correspond to the elongate protrusions 26.

Figure 11:
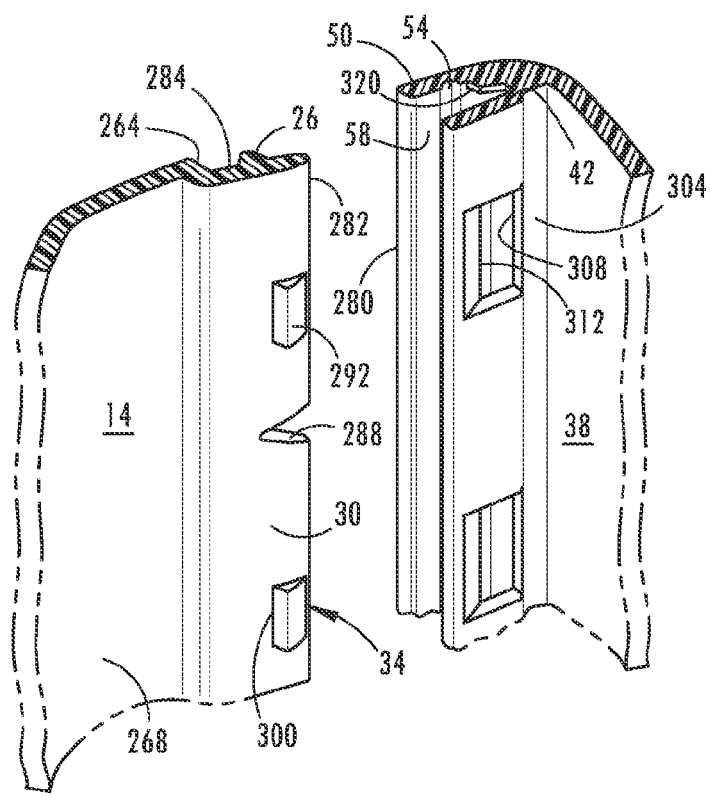
FIG. 11 is a top perspective cross-sectional view of the first trim piece separated from the second trim piece, taken at line XI-XI of FIG. 7.
Figure 11A:
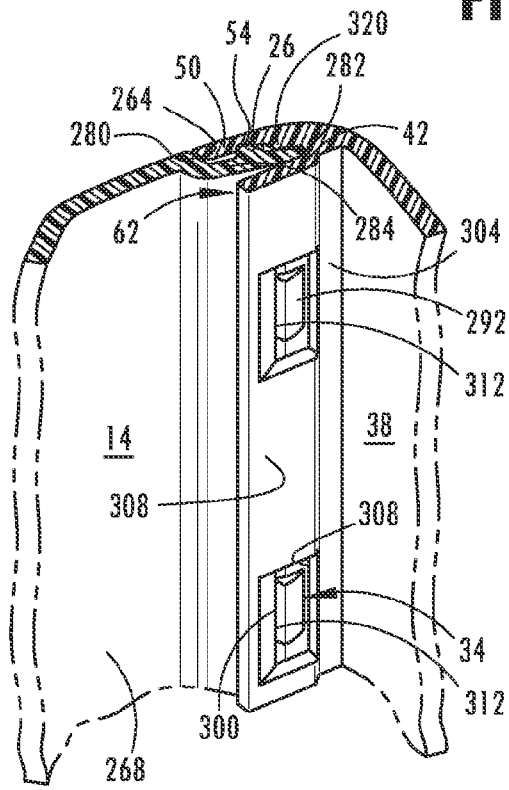
FIG. 11A is a top perspective cross-sectional view of the first trim piece engaged with the second trim piece, taken at line XI-XI of FIG. 7.
Figure 11B:
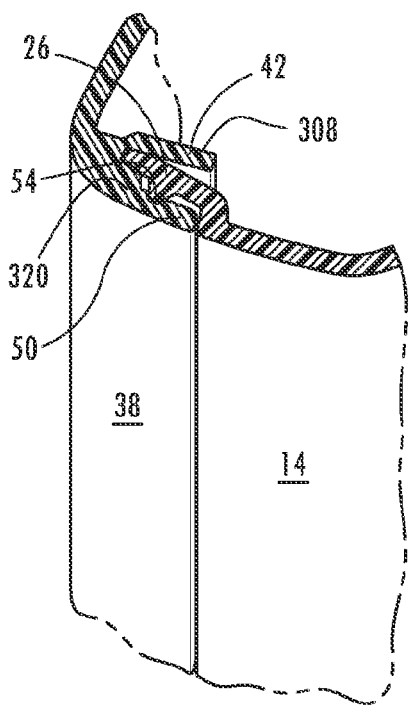
FIG. 11B is a top perspective cross-sectional view of the first trim piece engaged with the second trim piece, taken at line XI-XI of FIG. 7 and rotated relative to FIG. 11A.

Still referring to FIGS. 9-11B, a plurality of ribs 320, which may be flushness ribs, and a plurality of ribs 324, which may be location ribs, span the cavity 62 defined by the inner and outer walls 42, 50. The flushness ribs 320 and the location ribs 324 are thin curved features integrally protruding from the inner wall 42, the second trim piece 38, and the outer wall 50. The ribs 320, 324 span the cavity 62 perpendicular to the length of the cavity 62. The flushness ribs 320 are shorter than the location ribs 324 and are generally concave. The flushness ribs 320 engage the flange tip 282, as depicted in FIGS. 11 and 11B, and ensure the retention surfaces 300 of the attachment elements 34 are held in abutting contact with the retention edges 312 of the retention windows 46. The location ribs 324 can take a variety of shapes and sizes, but are configured to mate with the notches 288 of the body portion 284 when the flange 18 is inserted into the cavity 62. The location ribs 324 are positioned such that as the flange 18 is inserted into the cavity 62 the location ribs 324 make contact with the notches 288 and align the attachment elements 34 with the retention windows 46. Once the notches 288 mate with the location ribs 324 the attachment elements 34 are aligned and engaged with the retention windows 46 and the elongate protrusions 26 are engaged with the elongate channel 54. It is understood that some or all of the retention windows 46 and the attachment elements 34 may be reversed, such that the first trim piece 14 may include a retention window 46 and the second trim piece 38 may include an attachment element 34. Further, the flange sides 22, 30 on which the elongate protrusions 26 and the attachment elements 34 are located may also be reversed in a like manner. Similarly, in some embodiments the plurality of retention windows 46 may be located on the outer wall 50 and the elongate channel 54 disposed along the inner wall 42.

As depicted in FIGS. 10-11B, the cavity 62 removably engages with the flange 18 along the seam 250, placing the edge 264 of the first trim piece 14 in close proximity with the edge 280 of the second trim piece 38. The flange 18 extends laterally and at an angle from the first trim piece 14, such that the seam 250 is flush between the first and second trim pieces 14, 38. It is understood that the edges 264, 280 may also be configured to be in abutting contact, or flush, upon engagement of the first and second trim pieces 14, 38.

In some embodiments, the first trim piece 14 and the second trim piece 38 are removably engaged via snap fit. Snap fit, as defined herein, describes a self-locking joint whose mating parts exert a cam action, flexing until one part slips past a raised lip on the other part, preventing part separation. The thickness of the flange 18, between the tips of the attachment elements 34 and the tips of the elongate protrusions 26, is greater than the width of the cavity 62 defined by the inner surface 304 and the inner wall surface 58 of the inner and outer walls 42, 50. As such, the inner and outer walls 42, 50 are configured to deflect as the attachment elements 34 and the elongate protrusions 26 enter the cavity 62 during insertion of the flange 18 for engagement. As the attachment elements 34 engage the retention windows 46 and the elongate protrusions 26 engage the elongate channel 54, the inner and outer walls 42, 50 return to the pre-deflected orientation, thereby generating an audible click or snap. A vibration may also be generated as the inner and outer walls 42, 50 return to the pre-deflected orientation. Thereafter, the interaction between the retention surfaces 300 of the attachment elements 34 and the retention edges 312 of the retention windows 46 resist disengagement of the first trim piece 14 from the second trim piece 38. The interaction between the elongate protrusions 26 and the elongate channel 54 also assists in resisting disengagement of the first and second trim pieces 14, 38. In some embodiments, the resistance desired to disengage the first trim piece 14 from the second trim piece 38 is predetermined or configurable. The retention edges 312 of the retention windows 46 are capable of having different configurations which may need more or less force to disengage the retention surfaces 300 of the attachment elements 34 from the retention edges 312. In other embodiments, the number of windows 46 can be varied to create the desired level of retention between the first and second trim pieces 14, 38. In yet further embodiments, the attachment elements 34 and the elongate protrusions 26 can be configured to provide a predetermined level of retention between the first and second trim pieces 14, 38.

In an exemplary manufacturing method, the vehicle seatback 92 can be manufactured by providing the seatback support structure 120 with the attached airbag deployment system 66. The second trim piece 38 that has the cavity 62 including the retention windows 46, location ribs 324 and the channel 54 is attached to the support structure 120. The first trim piece 14 that has the flange 18 including the plurality of attachment elements 34, notches 288, and elongate protrusions 26 is provided. An operator aligns the flange 18 in the cavity 62 by mating the notches 288 with the location ribs 324 as the flange 18 is inserted into the cavity 62. As the attachment elements 34 engage the retention windows 46 and the elongate protrusions 26 engage the elongate channel 54, an audible snap is generated to inform the operator of successful engagement between the first and second trim pieces 14, 38. Thereafter, the engagement of the first and second trim pieces 14, 38 forms the breakaway seam 250 for deployment of the airbag 70 from the airbag deployment system 66 between the first and second trim pieces 14, 38.

Figure 12:
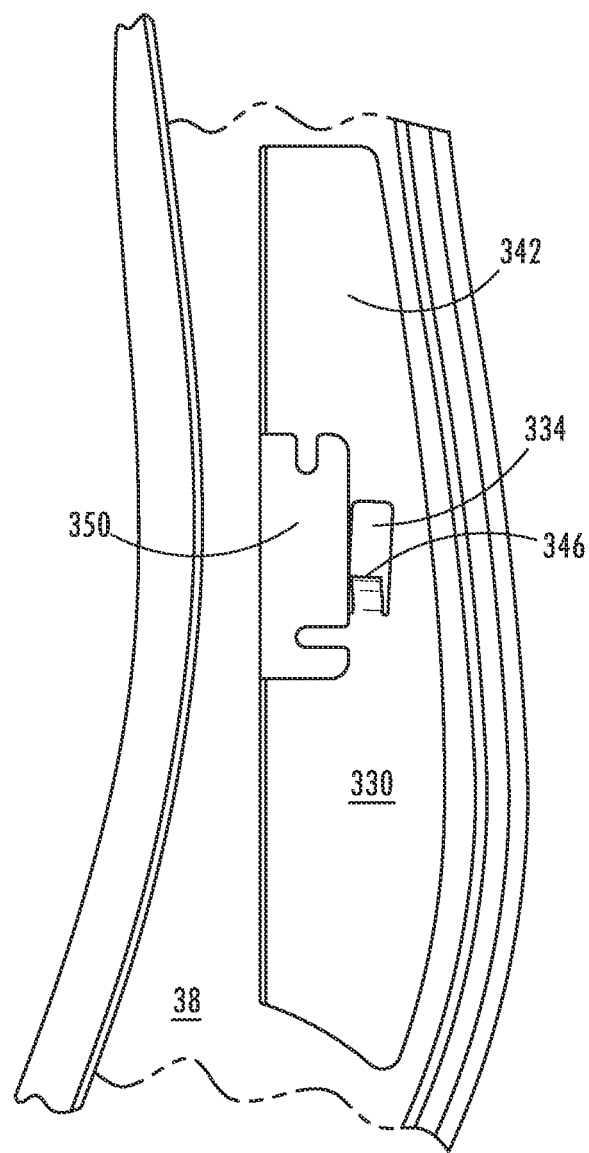
FIG. 12 is a side elevational view of one embodiment of an interior portion of a section of a second trim piece.
Figure 13A:
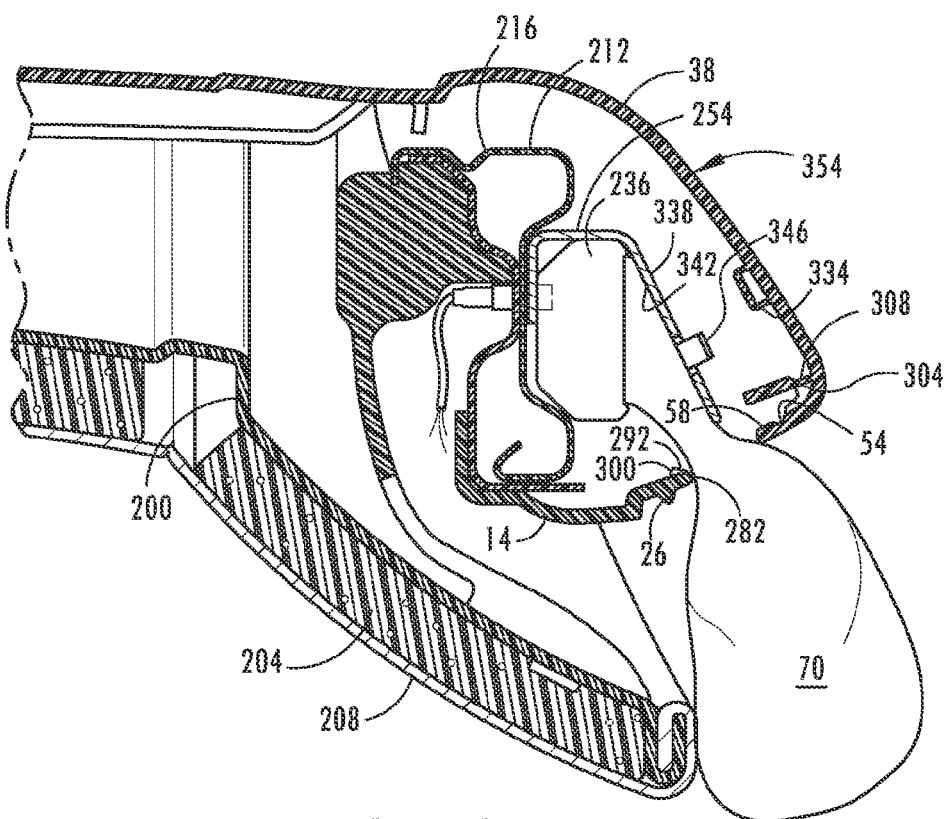
FIG. 13A is a cross-sectional view of the seatback having the airbag in an expanded position, taken at line XII-XII of FIG. 4.

Referring now to FIGS. 12-13A, the inside surface of the second trim piece 38 is shown having the sleeve member 330 attached to a loop feature 334 that protrudes inward from the inside surface. The sleeve member 330 couples between the second trim piece 38 and the airbag 70 for supporting and directing the airbag 70 though the seam 250 upon deployment. More specifically, the sleeve member 330 includes a planar member 338 adjacent to the inside surface of the second trim piece 38 that has a substantially planar surface 342 that is configured to contact and direct the airbag 70 through the seam 250, as explained in more detail below. The planar member 338 includes a tab 346 protruding outward to engage the loop feature 334 on the interior surface of the second trim piece 38. The sleeve member 330 also includes an L-shaped engagement member 350 that extends inward from the planar member 338 and forward to engage opposing sides of the lateral protrusion 244 on the base portion 236 of the airbag deployment system 66. The base portion 236 of the airbag deployment system 66 houses an electrical wire that couples with the vehicle controller 110. Accordingly, the sleeve member 330 has a generally C-shaped cross-section for containing the side airbag deployment system 66 and directing the airbag 70 through the seam 250.

Referring now to FIG. 13, the airbag 70 is shown in the contained position 248, where the airbag 70 is contained within the base portion 236 of the airbag deployment system 66 and substantially concealed by the trim pieces 14, 38. In this contained position 248, the first and second trim members 14, 38 engage along the seam 250 disposed on a forward facing portion of the exterior side member of the vehicle seat to conceal the airbag 70 and to provide a direction for accurately deploying the airbag 70 forward through the seam 250. A longitudinal section 354 of the second trim piece 38 curves rearward and inward to extend laterally and span across to conceal the rear area of the seatback 92. The first trim piece 14 extends laterally inward to engage the first frame member 216, whereby the flexible members 164 of the suspension assembly 160 extend forward to define the external peripheral gap 152 between the support structure 120 and the passenger support 138. It is contemplated that the specific shape and orientation of the first trim piece 14 and the second trim piece 38, especially with regard to components of the seatback 92 inboard the airbag deployment system 66, may be alternatively shaped and constructed.

As illustrated in FIG. 13A, the airbag 70 is deployed between the first and second trim pieces 14, 38 disengaging the seam 250. More specifically, the airbag 70 stowed within the base portion 236 of the airbag deployment system 66 deploys from the contained position 248 (FIG. 13) to the deployed position 118, as shown. In the deployed position 118, the airbag 70 inflates and extends from the base portion 236 laterally outward against the planar surface 342 of the planar member 338, directing the airbag 70 forward through the seam 250 and beyond the passenger support 138, as shown in FIGS. 3-4. In the deployed position 118, the airbag 70 provides a cushioned protective support between a seated passenger and an outboard interior surface of the vehicle 84, such as the side door (FIG. 1). Upon inflation of the airbag 70, the airbag 70 deforms the sleeve member 330 laterally outward and disengages it from the second trim piece 38. More specifically, the tab 346 on the sleeve member 330 disengages from the loop feature 334 on the second trim piece 38, causing the second trim piece 38 to move laterally away from the planar member 338 of the sleeve member 330. The sleeve member 330 thereby maintains its position relative to the first frame member 216 to continue to accurately direct the airbag 70 through the seam 250. Also, the expanding airbag 70 deforms the second trim piece 38 laterally outward with such force as to disengage the retention surfaces 300 of the attachment elements 34 from the retention edges 312 of the retention windows 46 and the elongate protrusions 26 of the flange 18 from the elongate channel 54 of the outer wall 50. The disengagement of the retention surfaces 300 from the retention edges 312 and the elongate protrusions 26 from the elongate channel 54 thereby disengages the flange 18 from the cavity 62, such that the seam 250 widens abruptly to accurately direct the airbag 70 forward between the first and second trim pieces 14, 38 and beyond the passenger support 138 with minimal resistance from the passenger support 138.

The deployed position 118, as shown in FIG. 13A, is merely one depiction of an incremental stage as the airbag 70, upon deployment, inflates at a rapid rate pushing the airbag 70 out from the base portion 236 of the airbag deployment system 66 in the outward and forward direction beyond the illustrated position. It is contemplated that the airbag 70 may inflate with gases generated from a pyrotechnic reaction, a compressed air release, and/or another chemical reaction or other conceivable inflation methods. It is also conceivable that after deployment of the airbag module, the airbag 70 may be constrained by internal tethers to prevent the airbag 70 from inflating beyond a desired location, and the airbag deployment system 66 may be replaced and the seatback assembly may be restored with minimal repair to the passenger support 138 and the suspension system.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seating assembly comprising:
    a first trim piece including a flange having a first side with intermittently-spaced elongate protrusions and a second side with intermittently-spaced attachment elements;
    a second trim piece including an inner wall having intermittently-spaced retention windows and an outer wall having an elongate channel disposed on an inner wall surface thereof, the inner and outer walls defining a cavity therebetween;
    wherein the flange engages the cavity such that the intermittently-spaced elongate protrusions are removably engaged with the elongate channel and the intermittently-spaced attachment elements are removably engaged with the intermittently-spaced retention windows; and
    an airbag deployment system positioned proximate the first and second trim pieces and configured to deploy an airbag between the first and second trim pieces.

2. The vehicle seating assembly of claim 1, wherein the retention windows and elongated protrusions are configurable to provide a predetermined resistance to deployment of the airbag between the first and second trim pieces.

3. The vehicle seating assembly of claim 1, further comprising:
    a plurality of ribs spanning the cavity, wherein the flange is configured to mate with the ribs such that upon mating the retention windows and the attachment elements are aligned and engaged.

4. The vehicle seating assembly of claim 1, wherein the first trim piece is a front trim piece of a vehicle seat and the second trim piece is a rear trim piece of the vehicle seat.

5. The vehicle seating assembly of claim 1, wherein the inner and outer walls of the second trim piece are configured to deflect during engagement of the flange to the cavity.

6. The vehicle seating assembly of claim 1, wherein the elongate channel extends a majority of the length of the cavity.

7. The vehicle seating assembly of claim 1, wherein the flange and the cavity removably engage to form a seam between the first and second trim pieces.

8. The vehicle seating assembly of claim 7, wherein the flange extends laterally and at an angle from the first trim piece such that the seam between the first and second trim pieces is flush.

9. A seating assembly comprising:
    a first trim piece including a flange having a first side with an elongate protrusion and a second side with an attachment element;
    a second trim piece including an inner wall having a window and an outer wall having an elongate channel, the inner and outer walls defining a cavity along an edge of the second trim piece, wherein the elongate protrusion engages the elongate channel and the attachment element engages the window; and
    an airbag deployment system configured to deploy an airbag between the first and second trim pieces.

10. The seating assembly of claim 9, wherein the first trim piece is a front trim piece of a seat and the second trim piece is a rear trim piece of the seat.

11. The seating assembly of claim 9, further comprising:
    a location rib spanning the cavity, wherein the flange is configured to mate with the rib such that upon mating the window and the attachment element are aligned and engaged.

12. The seating assembly of claim 9, wherein the elongate channel extends along a majority of the cavity length.

13. The seating assembly of claim 9, wherein the inner and outer walls of the second trim piece are configured to deflect during insertion of the flange into the cavity.

14. The seating assembly of claim 9, wherein the flange and the cavity engage to form a seam between the first trim piece and the second trim piece.

15. The seating assembly of claim 14, wherein the flange extends laterally and at inward angle from the first trim piece such that the seam of the first and second trim pieces is flush.

16. A vehicle seating assembly, comprising:
    an airbag;
    a front trim piece including a flange having intermittently-spaced attachment elements;
    a rear trim piece including inner and outer walls defining a cavity, the inner wall having a plurality of intermittently-spaced retention windows disposed thereon; and
    wherein the attachment elements snap-fit into the windows such that the flange engages the cavity to define a breakaway seam upon airbag deployment.

17. The vehicle seating assembly of claim 16, further comprising:
    an elongate protrusion disposed on the flange; and
    an elongate channel disposed on a wall of the cavity, wherein the elongate protrusion removably engages the elongate channel such that the protrusion disengages the channel upon deployment of the airbag.

18. The vehicle seating assembly of claim 17, wherein the elongate channel extends along a majority of the cavity length.

19. The vehicle seating assembly of claim 16, further comprising:
    a locating rib spanning the cavity; and
    a notch disposed through the flange, wherein the notch is configured to mate with the locating rib such that upon mating the retention windows and the attachment element are aligned and engaged.

20. The vehicle seating assembly of claim 16, wherein the flange and the cavity engage to form a flush seam between the front trim piece and the rear trim piece.

* * * * *